PORTABLE STEREOPHONIC RECORD PLAYER

Filed July 9, 1959 3 Sheets-Sheet 1

Inventor
ARTHUR K. TATEISHI
by: Douglas S. Johnson
Attorney

PORTABLE STEREOPHONIC RECORD PLAYER

Filed July 9, 1959 3 Sheets-Sheet 2

Inventor
ARTHUR K. TATEISHI
by: Douglas S. [signature]
Attorney

June 2, 1964 A. K. TATEISHI 3,135,837

PORTABLE STEREOPHONIC RECORD PLAYER

Filed July 9, 1959 3 Sheets-Sheet 3

Inventor
ARTHUR K. TATEISHI by:

Attorney 3,135,837

PORTABLE STEREOPHONIC RECORD PLAYER

Arthur K. Tateishi, 32 River St., Toronto, Ontario, Canada

Filed July 9, 1959, Ser. No. 826,072
6 Claims. (Cl. 179—100.4)

This invention relates to improvements in portable record players and has particular application to portable stereophonic record players with automatic record changers.

In the case of stereophonic reproduction the record pick up in response to the special grooving of a stereophonic record generates two separate signals which are amplified through independent amplifiers and delivered as sound waves through two independent speaker systems. Depending on the quality of the record player each speaker system may employ one or more speakers. For better quality players at least a relatively large low frequency "woofer" speaker and a relatively smaller high frequency "tweeter" speaker are employed in each speaker system and each speaker must be adequately baffled to give its proper frequency response characteristics.

Because of the dual sound channel system, and particularly the dual speaker system required, efforts in the past to incorporate stereophonics into a portable record player have produced bulky, cumbersome and heavy units which have greatly reduced their portability and hence saleability.

It is the object of the present invention to provide a stereophonic portable record player unit with automatic record changer which unit will be equally as compact as standard portable monaural automatic record changer players without in any way sacrificing fidelity of reproduction in the speaker systems.

A further object is to provide a compact stereophonic record player unit as aforesaid which will incorporate dual, fully adequate speaker systems commensurate with the quality of reproduction desired including fully effective baffling without giving rise to any appreciable increase in weight over corresponding monaural portable record players.

Involved in the reproduction of the two separate recordings through the two separate sound systems to produce the effect of two dimensional or stereophonic sound is the requirement to have a physical spacial separation of the speaker systems for optimum effects. It is another object of the present invention to provide an assemblage of speakers and automatic record changer whereby they can be quickly and easily assembled together into a compact portable unit and at the same time can be very quickly and easily set up in proper physical separation for stereophonic reproduction.

Again it is an object to ensure that in the assembled portable state all components will be fully protected against accidental damage during carriage.

Another important object is to provide a portable stereophonic record player as aforesaid of economical construction and attractive appearance.

In record players employing automatic record changers there is involved a central spindle of substantial height to receive the records, the spindle incorporating at a point spaced above the turntable the latch mechanism for releasing the lower record of the record stack on the spindle for dropping onto the turntable. Further, of course, such record changers incorporate the usual pick up or tone arm carrying the pick up cartridge and record groove tracking point and in addition employ a record support arm which is adapted to be raised to at least the top of the spindle and swung to one side clear of the turntable while in the raised position to allow the records to be stacked on the spindle. After record stacking the support arm is then adapted to be swung to a central position over the turntable where it is free to drop and lowered down on the records, the distance that the support arm is lowered depending on the number of records in the record stack on the spindle.

Since the spindle height imposes an unavoidable limitation on the compactness of automatic changer record players including portable record players of this nature, the principal feature of the invention resides in utilizing the space above the turntable to the full height of the spindle as speaker storage space whereby the additional speaker assemblages required for stereophonic reproduction can be housed in what previously in portable record players with automatic record changers was waste space.

In this connection it is another feature of the invention to provide for the dropping of the record support arm when swung clear of the turntable to a point adjacent to the tone arm to further augment the space available for speaker assembly storage without in any way increasing the minimum overall dimensions required for standard portable automatic changer record players.

Still another important feature resides in providing an arrangement of speakers which will compactly fit around the record spindle. In this connection since the space above the turntable to the height of the spindle is conventionally enclosed by a cover it is a further feature to incorporate the speaker assemblies to occupy the space surrounding the spindle into the cover for purposes of transport.

Another important feature resides in utilizing the walls of the cover structure not only for the purposes of the cover but also as effective baffle means for the speaker assemblies to be stored in the space surrounding the spindle during carriage.

Again it is a feature to provide for ready mechanical disconnection of the speaker assemblies incorporated into the cover so that the requisite spaced speaker assembly arrangements for proper stereophonic reproduction may be quickly and easily set up. Further in this connection it is a feature to provide registering means to enable the various components of the stereophonic system to be quickly brought together into correct relative relation and brought to the closed carrying position.

Another feature resides in utilizing the baffle means of the speaker assemblies incorporated into the cover to clamp down the turntable when the unit is in the closed position ready for carriage.

These and other objects and features will be understood from the following detailed description taken in conjunction with the accompanying drawings in which.

Figures 1, 2, 6:
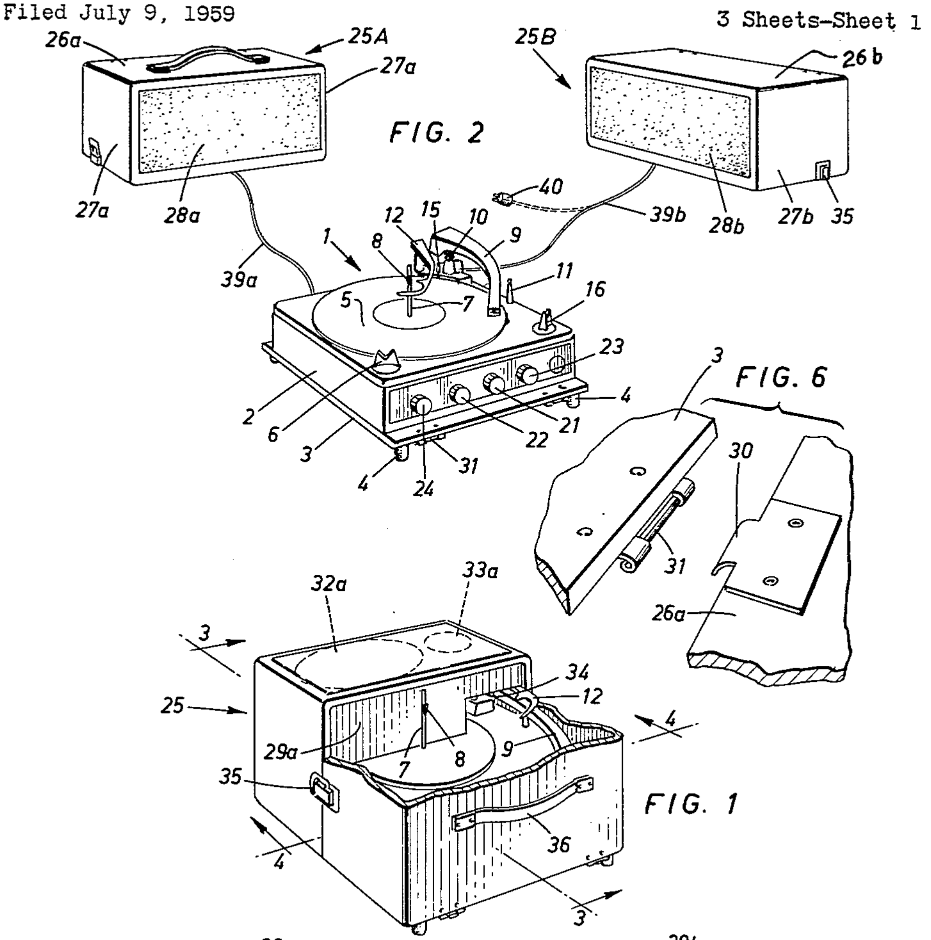
FIGURE 1 is a perspective view of a portable stereophonic record player with automatic changer constructed to embody the invention, the player being partly broken away for purposes of illustration, but otherwise being in the closed carrying position.
FIGURE 2 is a perspective view of the record player of FIGURE 1 showing the cover removed and set up as twin speaker units for stereophonic reproduction.
FIGURE 6 is a fragmentary perspective view illustrating one of the hinge interlocks between the base of the record player and one of the cover members.

With reference first to FIGURE 2, the record player comprises the usual automatic record changer generally designated at 1 mounted on a base housing 2 which conveniently is carried on a base plate or platform 3 provided with legs 4. The automatic record changer 1 comprises a turntable 5 which may be set to rotate at any one of the several usual speeds; i.e. 16, 33, 45 and 78 r.p.m. by means of a speed selector 6.

Projecting from the centre of the turntable is an upwardly extending spindle 7 provided adjacent the top with the usual latch mechanism designated at 8.

A tone arm 9 is supported from one corner of the base at 10 for the usual tone arm movement; that is, vertical movement to follow the up and down variations of the record groove and to accommodate the height of the record stack above the turntable 5. The tone arm further has lateral swinging movement to carry across towards the spindle in the playing of the record and to swing laterally away from the spindle to the limit rest position to one side of the turntable where it clips onto the post support 11.

The usual record support arm is also provided as indicated at 12 and has a depending post 13 which telescopes into a hollow support post 14.

The record support arm has the usual travel; that is, it is swingable laterally across the turntable above a stack of records (not shown) placed on the spindle 7, at which point it is adapted to be dropped down on the records to support them in the raised position ready for dropping onto the turntable. Further the support arm is adapted to be swung laterally to one side of the turntable.

15 represents the feeler lever which is actuated by the dropping of a record to signal continuance of operation of the record player and in the absence of a record striking the feeler arm, the mechanism is arranged to shut itself off following the playing of the last record.

A control 16 forms an on-off-reject switch.

So far, the components described are conventional to automatic record changers and form no part of the present invention.

In conventional automatic changer mechanisms, the record support arm is normally maintained in an elevated position corresponding to the full height to which it must be extended to overlie the maximum stack of records to be placed on the spindle when it is swung laterally to one side of the turntable.

In accordance with the present invention, however, the record support arm 12 is arranged to telescope downwardly into the support post 14 to lie immediately above the tone arm 9 when swung to the lateral rest position to one side of the turntable.

Figure 3:
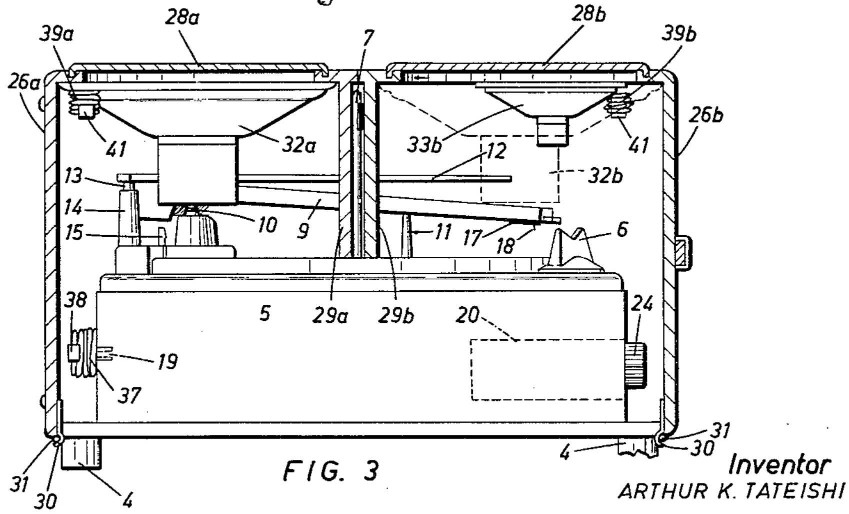
FIGURE 3 is an enlarged vertical sectional view taken on the line 3—3 of FIGURE 1.
Figure 4:
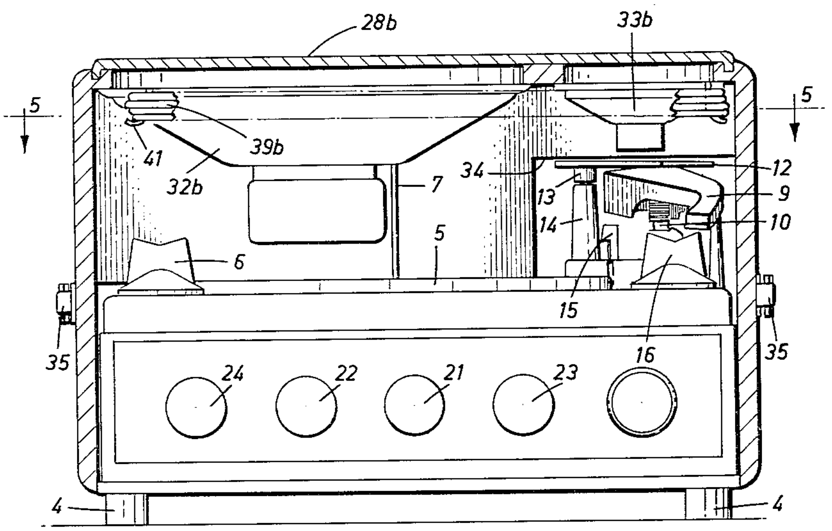
FIGURE 4 is an enlarged vertical sectional view taken on the line 4—4 of FIGURE 1.
Figure 5:
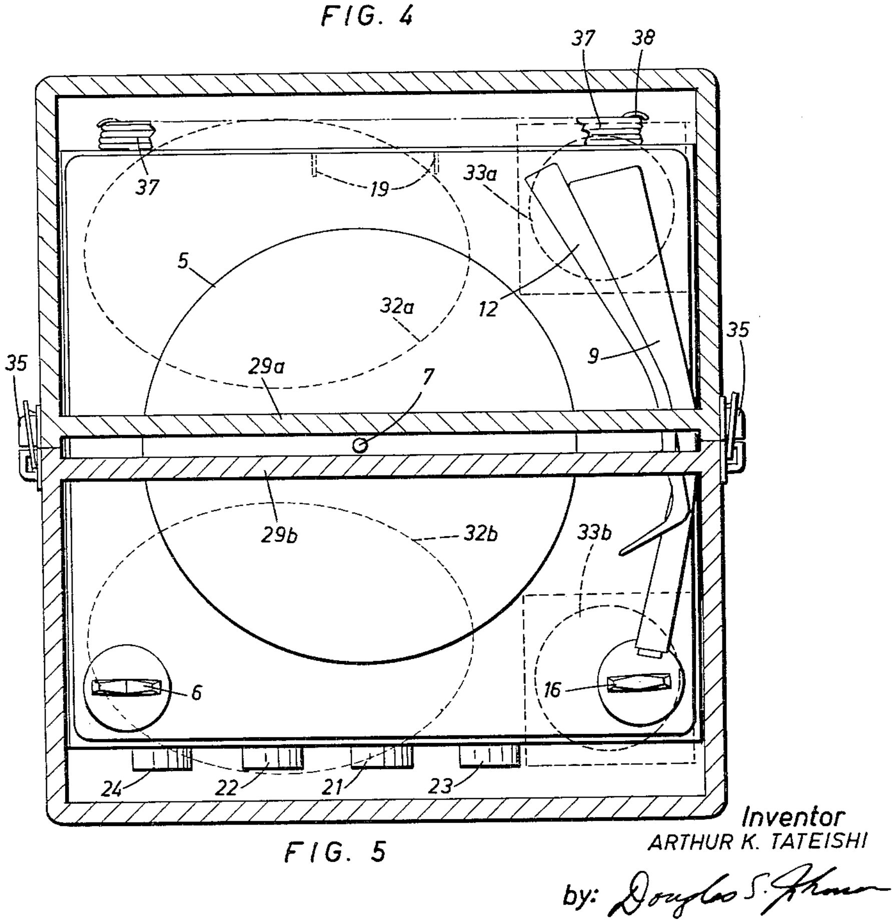
FIGURE 5 is a horizontal sectional view taken on the line 5—5 of FIGURE 4.

As the present invention is particularly applicable to stereophonic reproduction, the tone arm 9 is arranged to carry a stereophonic pick-up cartridge indicated at 17 in FIGURE 3. The cartridge is conventional and in itself forms no part of the present invention. Its operation will be understood in that it responds to the movement of its pick-up point 18 in the grooving of a stereophonically grooved record to produce two separate pick-up signals. Usually the record involves a complex groove with two sets of deviations at right angles to each other and both normally at 45° to the surface of the record; one set producing one of the signals and the other set producing the other of the signals, although it will be appreciated that the invention is not limited to the particular details of the pick-up or record grooving.

The two signals generated in the pick-up cartridge 17 are fed to two independent amplifiers with two independent outlets 19. The circuitry of the amplifiers does not form part of the present invention, and the amplifiers have been designated in block form only as shown in dotted line in FIGURE 3 and indicated at 20.

It will be understood that the amplifiers and their associate circuits can be formed as a very compact unit, easily housed within the base housing 2. The controls for the amplifier comprise the volume control 21, the bass control 22, the treble control 23 and the balance control 24 which is used with the 2-channel amplifiers of a stereophonic reproduction system to enable the balancing of the output of the 2 channels as is well understood in the art.

In the reproduction of the output of the 2 sound systems to produce the desired stereophonic effect, there must of necessity be employed two speaker systems and these speaker systems must have substantially identical response characteristics. Similarly, of course, the twin or dual-channel amplifier system must produce balanced or corresponding inputs to the speaker assemblies.

Further, the speakers must, when set up for reproduction, be physically spaced so that the desired 2-dimensional sound effect is created.

An additional factor is that when the 2-dimensional sound effect is desired, almost inherently a full range frequency response of the speakers is also a requisite with a low distortion factor, as otherwise the sound depth will be wasted.

The net result is that in addition to requiring two separate speaker assemblies to reproduce the two separate outputs of the dual-channel amplifier system, each of the speaker assemblies must itself be sufficiently complex to produce a broad frequency response.

It has been the requisites of the speaker assemblies that have heretofore prevented the manufacture of a compact portable stereophonic record player.

According to the present invention, however, a portable record player which employs, as do all of the more expensive ones, an automatic changer, may be produced as a portable stereophonic automatic changer record player without increase in size, by utilizing the cover as a part of, or a carrier for at least part of the speaker systems, and storing speakers in the space normally wasted overlying the turntable to the full height of the spindle.

In the form of the invention shown in FIGURES 1 to 6, the two speaker assemblies 25A and 25B together form the cover designated at 25 in FIGURE 1. Each of the speaker assemblies 25A and 25B comprises a box-like structure with the speaker assembly 25A having, when viewed in the position shown in FIGURE 2, an upper surface **26*a*, end surfaces 27*a*, and a front face or speaker grill 28*a*. When the speaker assembly is in the record player covering or closed position as illustrated in FIGURE 1, the surface 26*a* forms the outer wall of the cover extending transversely of the length of the tone arm 9 and record support arm 12 when the latter arms are in the rest position. The surfaces or walls 27*a* form one-half the side walls of the cover taken in a direction along the length of the tone and record support arms when the latter are in the rest position. The surface 28*a*** forms the upper surface of the cover.

Slightly above the lower edge of the speaker grill **28*a*, when viewing the speaker assembly 25A in FIGURE 2, and slightly within the edges of the side walls 27*a*, when the speaker assembly 25A is in the closed position of FIGURE 1, is a further partition 29*a* which is adapted, when the cover 25A is in the closed position, to clamp down the turntable 25 against the action of its spring support (not shown) which, as is conventional, normally allows the record changer to float. The clamping down action of the partition 29*a*** will facilitate the transportation of the record player, minimizing damage in transit.

To properly locate the cover portion 25A comprised by the left speaker assembly, the surface **26*a*** which, when the speaker assembly is in position for reproduction, as shown in FIGURE 2, is the upper surface of the unit, but which, when the speaker assembly is forming a portion of the cover, is the outer side wall of the cover, carries a hinge knuckle 30 which is adapted to engage with a hinge barrel 31 carried by the base plate or platform 3 of the record changer 1. Upon bringing the parts 30 and 31 together, it being understood that there are a pair of spaced such parts, the speaker assembly 25A will be located relative to the automatic record changer 1 and its base housing 2 and base platform 3 whereby it can be swung to the closed position illustrated in FIGURE 1 and FIGURE 3.

Conveniently, the speaker assembly 25A is provided with a relatively large, substantially elliptical low-frequency responsive or "woofer" speaker 32*a* and a relatively smaller high-frequency responsive or "tweeter" speaker 33*a*.

The arrangement of the speakers is such that the relatively large low-frequency responsive speaker 32*a* extends transversely of the length of the tone and record support arms 9 and 12 respectively but laterally to one side of these arms to occupy the space above the turntable and extending from adjacent to the turntable to the top of the spindle 7.

The relatively smaller or high-frequency responsive speaker 33*a* is supported to overlie the tone and record support arms 9 and 12 while the latter are in the rest position. In order to accommodate the speaker 33*a*, it will be understood that the record support arm 12 must be given additional movement over and above conventional automatic record changer support arms to allow it to drop down to a point adjacent the rest position of the tone arm to provide the space thereabove to accommodate the high-frequency responsive speaker.

It will therefore be appreciated that both the relatively large low-frequency responsive and the relatively smaller high-frequency responsive speakers are both contained or housed within space overlying the turntable to the top of the spindle which previously has been essentially waste space by virtue of the position occupied by the record support arm which for purposes of lowering to accommodate the cover, previously has been swung across to the centre of the turntable and dropped toward the turntable, thus leaving the space occupied by the present speakers unavailable.

It will be understood that the right-hand speaker 25B will have corresponding surfaces 26*b*, 27*b*, 28*b* and 29*b*, and will carry similar hinge members 30 to engage hinge members 31 on the platform 3 with the respective hinge members 30 and 31 associated with the right speaker assembly 25B being staggered differently than those associated with the left speaker assembly 25A, so that the two cover parts cannot be interchanged or improperly assembled. Further, of course, the right-hand speaker 25B is provided with corresponding speakers 32*b* and 33*b* corresponding to speakers 32*a* and 33*a*. The partitions 29*a* and 29*b* will be notched as indicated at 34 to receive the tone and record support arms 9 and 12 therebeneath.

With the two speaker assemblies 25A and 25B assembled with the automatic record changer 1 including the base housing 2 and platform 3 and moved to the closed position of FIGURE 1, they are adapted to be locked in the closed position by interengaging latch means indicated at 35 and one of the speaker assemblies is provided with a carrying handle 36. As shown particularly in FIGURE 3, when the speaker assemblies are formed into the cover 25 in the closed position and locked by the latch means 35, the spindle 7 will be received between the two partitions 29*a* and 29*b* which will clamp down the changer.

It will be understood that the record changer 1 will be provided with a suitable plug-in connection which conveniently can be a lead 37 which can be coiled on or stored on hooked lugs 38 carried by the base housing 2. Similarly, each of the speaker assemblies 25A and 25B are provided with leads 39*a* and 39*b* which are adapted to plug into the outlets 19 and carry plug connectors 40 for this purpose and these leads 39*a* and 39*b* are adapted to be stored within the assemblies 25A and 25B by winding them on hooked lugs 41.

In forming the speaker assemblies 25A and 25B in the manner described to form the cover 25, a dual purpose of the various surfaces or walls 26*a*, 26*b*, 27*a*, 27*b*, etc., is provided. These surfaces or walls not only form the walls of the ultimate cover, but additionally provide baffling to produce the requisite acoustical response characteristics of the speakers. In other words, by forming the speaker assemblies into the cover the maximum amount of baffling commensurate with the overall size of the cabinet of the portable record player, whose requisite is that it must be portable, is obtained. Further the baffling is obtained without any substantial addition to the weight of the conventional portable automatic changer record player and only the actual weight of the additional speaker elements themselves together with the minor addition of weight that might occur in the amplifier system is added to the conventional portable automatic changer record player.

By having the two speaker assemblies 25A and 25B independently separable from the automatic record changer 1, they may be conveniently handled and spaced in any desired manner. For instance, to augment the baffling, it may be desired to place both speakers against a wall with the grills 28*a* and 28*b* outwardly at a suitable separation.

When assembled, the two speakers provide a balanced attractive finish for the case, augmented by the appearance of the grills 28*a* and 28*b*.

Figure 7:
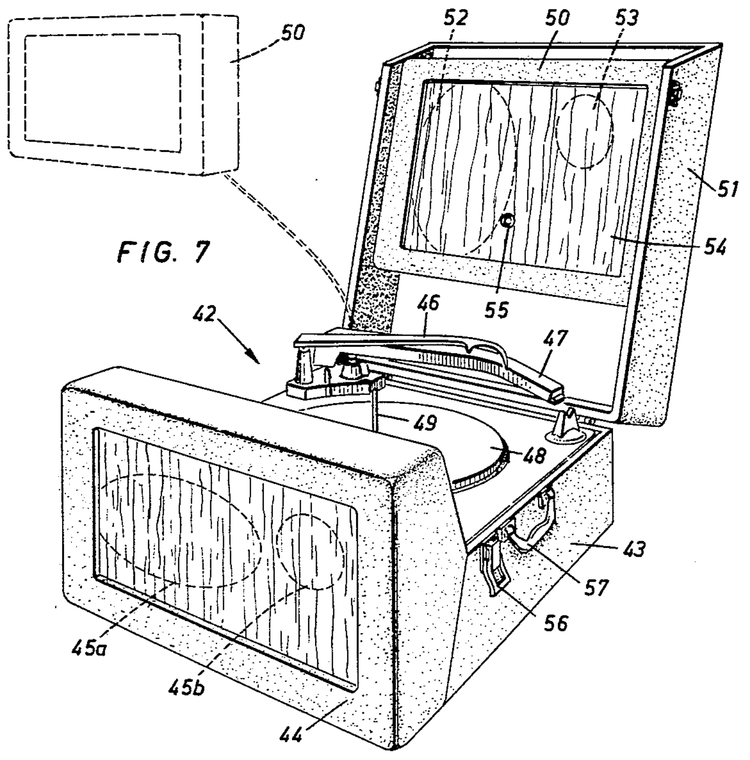
FIGURE 7 is a perspective view showing an alternative form of portable stereophonic record player embodying the invention with the cover speaker assembly shown in dotted lines removed from the cover and located for stereophonic reproduction.
Figure 8:
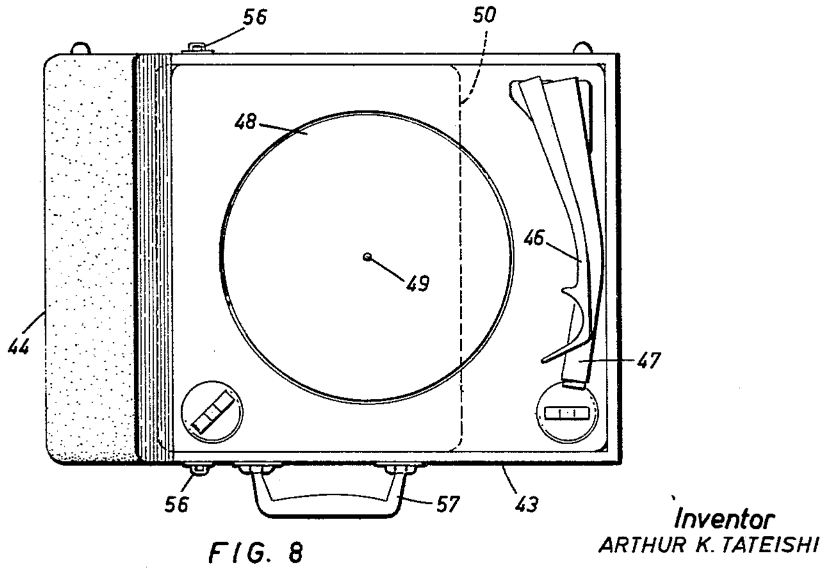
FIGURE 8 is a plan view of the record player of FIGURE 7 with the cover removed.

FIGURES 7 and 8 illustrate an alternative form which the invention may take. In this case, the automatic record changer designated at 42 is carried in the lower portion of a casing 43 which has a raised front face 44 housing one of the speaker assemblies of a sterophonic pair of speakers. Again the speaker assembly includes a relatively large low-frequency responsive speaker and a relatively smaller high-frequency responsive speaker indicated in dotted line in FIGURE 7 at 45*a* and 45*b* respectively. Again, the record support arm 46 is arranged to have a rest position to one side of the turntable at a point lowered down immediately above the tone arm 47, so that the space above the turntable 48 to the height of the spindle 49 is available for storage of speakers. In this case, the matching stereophonic speaker assembly comprises a speaker housing 50 releasably clipped into the cover 51 of the record player as shown in FIGURE 7. The housing 50 and the speakers, comprising a relatively large low-frequency responsive speaker 52 and a relatively smaller high-frequency responsive speaker 53 carried thereby, are removable from the cover 51, as indicated in dotted lines in FIGURE 7, for location at any desired point relative to the speaker assembly embodied in the front face 44. With the speaker housing 50 and speakers 52 and 53 carried thereby mounted in the cover 51, they are in a position when the cover is closed to occupy the space above the turntable, as indicated in dotted line in FIGURE 8, to the full height of the spindle 49. The grill 54 of the speaker housing or assembly 50 is provided with an opening 55 to receive the spindle 49 when the cover 51 is swung to the closed position. Suitable latches 56 are provided to lock the cover in the closed carrying position and the casing 43 is provided with a carrying handle 57.

It will be understood that various other arrangements and alterations to employ what previously has been waste space may be resorted to within the spirit of the invention and scope of the appended claims.

The embodiments of the invention in which an exclusive property or privilege is claimed are defined as follows:

1. A portable automatic changer record player comprising a base, an automatic record changer mounted on said base and having a resiliently supported turntable, a record receiving spindle projecting upwardly from the centre thereof and a tone arm and a record support arm swingable laterally to one side of said turntable, a cover structure for closing said record changer, said cover structure having a depth substantially corresponding to the height of said spindle above said turntable, and a speaker assembly comprising at least one speaker housed beneath said cover and overlying at least a portion of said turntable and lying substantially wholly below the upper end of said spindle with said cover structure in record changer closing position said cover structure having a surface adapted to engage said turntable and substantially restrain movement thereof in said closed position.

2. A portable automatic changer stereophonic record player comprising a bottom housing supporting at the top thereof an automatic record changer having a resiliently mounted turntable, a record receiving spindle projecting upwardly from the centre of said turntable, a tone arm having a pick up responsive to the grooving of a stereophonically grooved record to produce a dual signal output swingable to a rest position at one side of said turntable substantially below the top of said spindle, and a record support arm swingably movable laterally and downwardly to a rest position at one side of said turntable immediately adjacent to said tone arm substantially below the top of said spindle, dual amplifier means for amplifying the dual signal output of said pick up, and dual speaker means for reproducing the outputs of said dual amplifier means, and a cover structure adapted to co-operate with said bottom housing to move to a closed position covering said record changer, at least one of said dual speaker means being carried by said cover structure to occupy when said cover structure is in the closed position space immediately above said turntable with said latter speaker means lying substantially wholly below the upper end of said spindle, said cover structure having a surface, in the closed position, adapted to engage said turntable and substantially restrain movement thereof.

3. A record player as claimed in claim 2 in which said speaker means carried by said cover structure comprises at least one relatively large low frequency response speaker disposed to occupy space above said turntable clear of the rest position of said tone arm and record support arm, and at least one relatively smaller high frequency response speaker.

4. A record player as claimed in claim 3 in which one of said dual speaker means is mounted in said bottom housing.

5. A record player as claimed in claim 3 in which both of said dual speaker means are carried by said cover structure and lie substantially wholly below the upper end of said spindle.

6. A record player as claimed in claim 2 in which said cover structure comprises a pair of mating box sections open at the underside to receive said record changer with the cover structure moved to the closed position, each of said box sections extending, when in closed position, laterally across said tone and record support arms when same are in said rest position, and each of said dual speaker means comprises two speakers mounted on one of said box sections comprising a relatively large speaker disposed with said cover structure closed to occupy space above said turntable clear of the rest position of said tone and record support arms and extending to adjacent the upper end of said spindle, and a relatively smaller speaker disposed with said cover structure closed to occupy space above the rest position of said arms and extending to adjacent the upper end of said spindle.

References Cited in the file of this patent

UNITED STATES PATENTS

| | | |
|---|---|---|
| D. 186,244 | Steidinger | Sept. 29, 1959 |
| 2,923,370 | De Capite | Feb. 2, 1960 |
| 2,973,207 | Van Antwerp | Feb. 28, 1961 |

FOREIGN PATENTS

| | | |
|---|---|---|
| 909,299 | France | Dec. 10, 1945 |
| 1,215,356 | France | Apr. 19, 1960 |
| 1,227,343 | France | Oct. 19, 1960 |